(12) United States Patent
Qiu et al.

(10) Patent No.: US 11,561,053 B2
(45) Date of Patent: Jan. 24, 2023

(54) HEAT EXCHANGER WITH INTERNAL THERMAL VALVE

(71) Applicant: Zhejiang Sanhua Automotive Components Co., Ltd., Zhejiang (CN)

(72) Inventors: Haoming Qiu, Zhejiang (CN); Xiaojun Qian, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 152 days.

(21) Appl. No.: 16/756,103

(22) PCT Filed: Oct. 12, 2018

(86) PCT No.: PCT/CN2018/110024
§ 371 (c)(1),
(2) Date: Apr. 14, 2020

(87) PCT Pub. No.: WO2019/076246
PCT Pub. Date: Apr. 25, 2019

(65) Prior Publication Data
US 2021/0190446 A1 Jun. 24, 2021

(30) Foreign Application Priority Data
Oct. 18, 2017 (CN) .......................... 201710971718.9

(51) Int. Cl.
*F28F 27/02* (2006.01)
*F28D 9/00* (2006.01)
(Continued)

(52) U.S. Cl.
CPC .............. *F28F 27/02* (2013.01); *F28D 9/005* (2013.01); *F16H 57/0417* (2013.01); *F28D 2021/0089* (2013.01)

(58) Field of Classification Search
CPC ....... F28F 27/02; F28F 2250/06; F28D 9/005; F28D 2021/0089; F16H 57/0417
See application file for complete search history.

(56) References Cited

U.S. PATENT DOCUMENTS 5,950,715 A * 9/1999 Jonsson .................. F28D 9/005
165/103
8,839,748 B2 * 9/2014 Kim ........................ F28D 9/005
123/41.33
(Continued)

FOREIGN PATENT DOCUMENTS

CN 102312997 A 1/2012
CN 103134356 A 6/2013
(Continued)

OTHER PUBLICATIONS

Extended European Search Report for European Application No. 18867483.2, dated May 25, 2021.
(Continued)

*Primary Examiner* — Travis Ruby
(74) *Attorney, Agent, or Firm* — Wolf, Greenfield & Sacks, P.C.

(57) ABSTRACT

A heat exchanger including a temperature control assembly and a heat exchange assembly is disclosed. A heat exchange channel is formed within the heat exchange assembly. A branch channel arranged in parallel with the heat exchange channel is provided within the heat exchanger. The heat exchanger has a liquid inlet and a liquid outlet. The temperature control assembly includes a valve body. A valve cavity in communication with the liquid inlet is provided in the valve body. A gap and a second valve port are provided at a peripheral wall of the valve body. An annular protrusion is provided on an inner wall of the valve cavity. The valve body is provided with a valve core and a drive component therein.

11 Claims, 4 Drawing Sheets

(51) Int. Cl.
*F16H 57/04* (2010.01)
*F28D 21/00* (2006.01)

(56) References Cited

U.S. PATENT DOCUMENTS

| | | | |
|---|---|---|---|
| 9,074,518 B2 | 7/2015 | Kim et al. | |
| 9,255,748 B2* | 2/2016 | Cho | F28D 9/005 |
| 9,982,956 B2* | 5/2018 | Sheppard | G05D 23/025 |
| 10,190,453 B2 | 1/2019 | Kim et al. | |
| 2008/0029246 A1* | 2/2008 | Fratantonio | G05D 23/1333 |
| | | | 165/103 |
| 2012/0175092 A1* | 7/2012 | Otahal | F28D 9/005 |
| | | | 165/166 |
| 2012/0273177 A1* | 11/2012 | Kim | F01M 5/002 |
| | | | 165/164 |
| 2013/0133874 A1 | 5/2013 | Kim et al. | |
| 2013/0160972 A1 | 6/2013 | Sheppard et al. | |
| 2013/0327287 A1 | 12/2013 | Kim et al. | |
| 2014/0116648 A1 | 5/2014 | Cho et al. | |
| 2014/0150739 A1 | 6/2014 | Kim et al. | |
| 2015/0129173 A1* | 5/2015 | Seon | F02G 5/02 |
| | | | 165/100 |
| 2015/0316331 A1* | 11/2015 | Kim | F28D 9/0012 |
| | | | 165/81 |
| 2016/0363014 A1 | 12/2016 | Kim et al. | |
| 2016/0363399 A1 | 12/2016 | Kim et al. | |
| 2017/0037770 A1 | 2/2017 | Cook et al. | |
| 2017/0175599 A1* | 6/2017 | Ariyama | F01M 5/002 |
| 2017/0299045 A1* | 10/2017 | Kim | F01M 5/00 |
| 2018/0010866 A1* | 1/2018 | Sheppard | F28D 9/005 |
| 2019/0234507 A1* | 8/2019 | Qiu | F16K 31/002 |
| 2020/0224759 A1* | 7/2020 | Qiu | F16K 31/002 |

FOREIGN PATENT DOCUMENTS

| | | |
|---|---|---|
| CN | 103486884 A | 1/2014 |
| CN | 103790689 A | 5/2014 |
| CN | 103851938 A | 6/2014 |
| CN | 104806739 A | 7/2015 |
| CN | 104813086 A | 7/2015 |
| CN | 106246885 A | 12/2016 |
| CN | 106246953 A | 12/2016 |
| CN | 106437996 A | 2/2017 |
| CN | 106704685 A | 5/2017 |
| DE | 10 2016 209 592 A1 | 12/2016 |
| KR | 10-2013-0011114 A | 1/2013 |
| KR | 10-1416388 B1 | 7/2014 |
| KR | 10-1744812 B1 | 6/2017 |
| WO | WO 2011/032156 A2 | 3/2011 |

OTHER PUBLICATIONS

First Office Action for Korean Application No. 10-2020-7013466, dated Jun. 28, 2021.

International Search Report and Written Opinion for International Application No. PCT/CN2018/110024, dated Jan. 9, 2019.

PCT/CN2018/110024, Jan. 9, 2019, International Search Report and Written Opinion.

* cited by examiner

HEAT EXCHANGER WITH INTERNAL THERMAL VALVE

This application is a national stage filing under 35 U.S.C. § 371 of International Patent Application Serial No. PCT/CN2018/110024, filed Oct. 12, 2018, which claims priority to Chinese Patent Application No. 201710971718.9, titled "HEAT EXCHANGER", filed with the China National Intellectual Property Administration, on Oct. 18, 2017. The contents of these applications are incorporated herein by reference in their entirety.

FIELD

The present application relates to the technical field of heat exchange loops, and in particular to a heat exchange device used in a heat exchange loop.

BACKGROUND

When the vehicle is travelling normally, the temperature of the gearbox lubricating oil is generally not too high, and the lubricating performance thereof can be maintained well; In a case that the vehicle is overloaded or the vehicle is travelling in a snowfield or off-road in a four-wheel driving mode, the vehicle actually travels under an excessive slippage condition of a hydraulic torque converter, which may cause the temperature of the gearbox lubricating oil to be too high, and finally causes the failure of the lubricating oil.

Therefore, a cooling system composed of a heat exchange loop is further provided in the interior of the vehicle, and the heat exchange loop can cool the gearbox lubricating oil to ensure the performance of the lubricating oil.

The heat exchange loop generally includes a thermostatic valve, a heat exchanger and pipelines connected therebetween. In use, the lubricating oil flows through the thermostatic valve first; if the temperature of the lubricating oil is within a normal range, the lubricating oil can then directly be led to parts to be lubricated; and, if the temperature is too high, the thermostatic valve can control the lubricating oil to flow into the heat exchanger for cooling, and then the lubricating oil is led to the parts to be lubricated, so that the temperature of the lubricating oil can be always kept within a certain temperature range.

However, with the continuous development of the vehicle technology, requirements of users and various major vehicle manufacturers for lightweight and high integration of the vehicle body are getting higher and higher. The heat exchange loop including the thermostatic valve, the heat exchanger and the multiple pipelines has a too complex structure, which not only occupies a large space in the vehicle, but also affects the miniaturization of other parts in the vehicle, and is difficult to meet the development requirements of the times.

Therefore, a technical problem to be solved urgently by those skilled in the art is how to provide a heat exchange loop with a simple structure and small space occupation.

SUMMARY

An object of the present application is to provide a heat exchange device which can simplify the structure of a heat exchange loop and reduce the space occupation of the heat exchange loop.

In order to solve the above technical problem, the present application provides a heat exchange device which includes a temperature control assembly and a heat exchange assembly. A heat exchange passage is formed in the heat exchange assembly. A branch passage arranged in parallel with the heat exchange passage is provided in the heat exchange device. The heat exchange device has a liquid inlet and a liquid outlet. Outlets of the heat exchange passage and the branch passage are in communication with the liquid outlet. The temperature control assembly includes a valve body. The valve body has a valve chamber, and the valve chamber is in communication with the liquid inlet. A notch and a second valve port are provided at intervals on a peripheral wall of the valve body in an axial direction, the notch is relatively away from the liquid inlet, and the second valve port is relatively close to the liquid inlet. The notch can communicate the valve chamber with the heat exchange passage, and the second valve port can communicate the valve chamber with the branch passage. An annular projection is provided on an inner wall of the valve chamber, a first valve port is formed at a middle of the annular projection, and the first valve port can communicate the notch with the second valve port. A valve core and a drive component are further provided inside the valve body. The valve core is cylindrical, a peripheral wall of the valve core is sound, and the valve core is in a sliding fit with the inner wall of the valve chamber. The drive component is in cooperation with the first valve port. The peripheral wall of the valve core can block the second valve port through an action of the valve core, and the drive component can block the first valve port through an action of the drive component. In a case that the second valve port is in a blocked state, the first valve port is in an open state.

The heat exchange device provided by the present application can simplify the structure of the heat exchange loop and reduce the space occupation of the heat exchange loop, and can meet the requirements for integration and lightweight of vehicle in the conventional technology.

The valve core of the temperature control assembly of the heat exchange device has a cylindrical structure, and no opening or the like structure is provided on the peripheral wall of the valve core, which can avoid the second valve port from being opened after the second valve port is closed in a moving process of the valve core, and is beneficial to improving the reliability of the blocking of the second valve port.

Reference numerals shown in FIGS. 1 to 7 are listed as follows:

| | | |
|---|---|---|
| 1 temperature control assembly, | 11 valve body, | 111 notch, |
| 112 second valve port, | 113 first valve port, | 12 valve core, |
| 121 supporting plate, | 121a diversion hole, | 121b center hole, |
| 13 thermal element, | 131 valve rod, | 132 housing, |
| 14 elastic member, | 15 valve seat, | 16 snap ring, |
| 17 annular projection; | | |
| 2 heat exchange assembly; | | |
| 3 top plate, | 31 refrigerant inlet, | 32 refrigerant outlet; |
| 4 bottom plate, | 41 liquid inlet, | 42 liquid outlet; |
| A heat exchange passage, | A1 first passage, | B branch passage, |
| C valve chamber. | | |

DETAILED DESCRIPTION OF THE EMBODIMENTS

For those skilled in the art to better understand technical solutions of the present application, the present application will be further described in detail in conjunction with drawings and embodiments hereinafter.

The term "multiple" as used herein refers to an uncertain plural, usually two or more.

Terms such as "first", "second" and the like in the present application are only intended to distinguish multiple components or structures having the same or similar structures, and do not indicate a particular limitation on the order.

Figure 1:
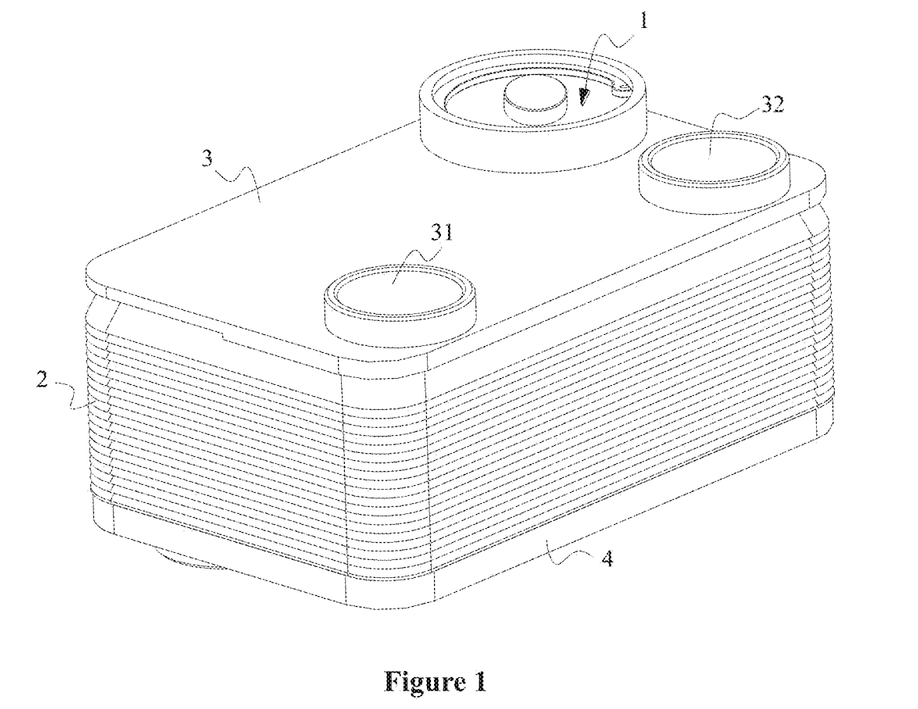
FIG. 1 is a schematic structural view of a specific embodiment of a heat exchange device according to the present application.
Figure 2:
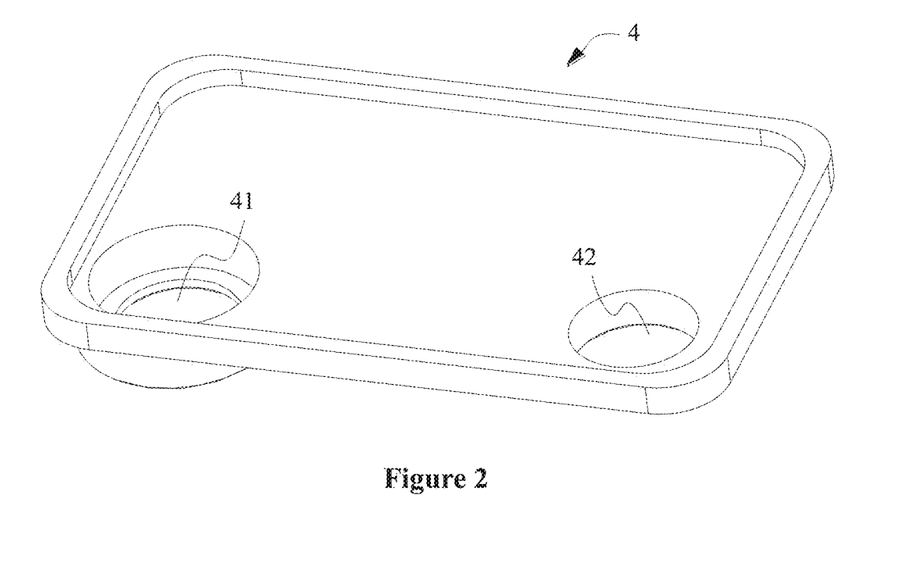
FIG. 2 is a schematic structural view of a bottom plate in FIG. 1.
Figure 3:
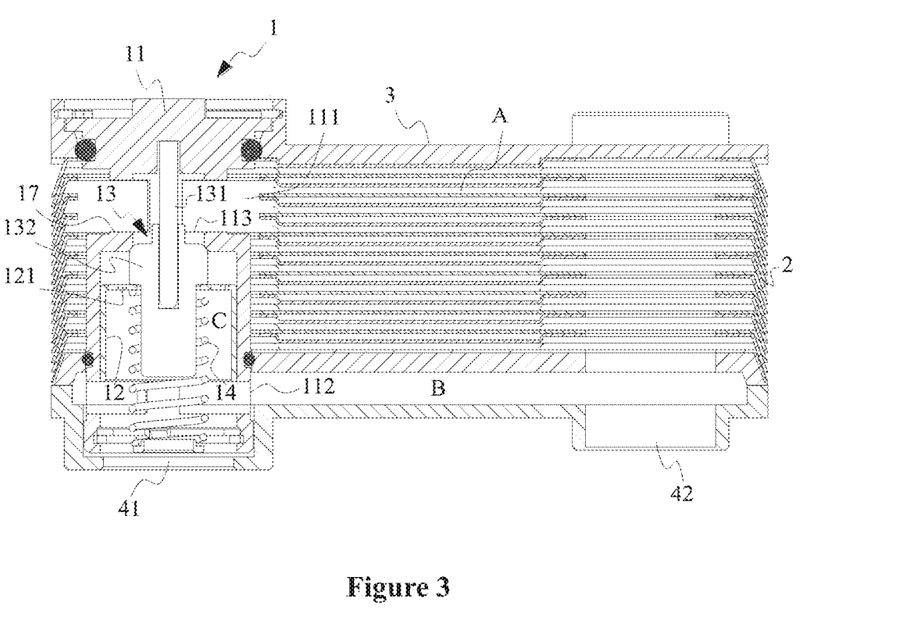
FIG. 3 is a schematic sectional view of the heat exchange device according to the present application when the temperature is normal.
Figure 4:
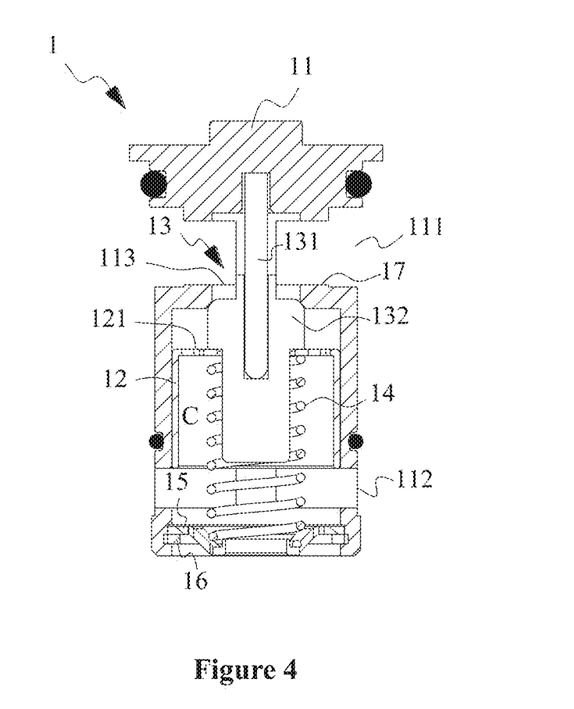
FIG. 4 is a schematic structural view of a temperature control assembly in FIG. 3.
Figure 5:
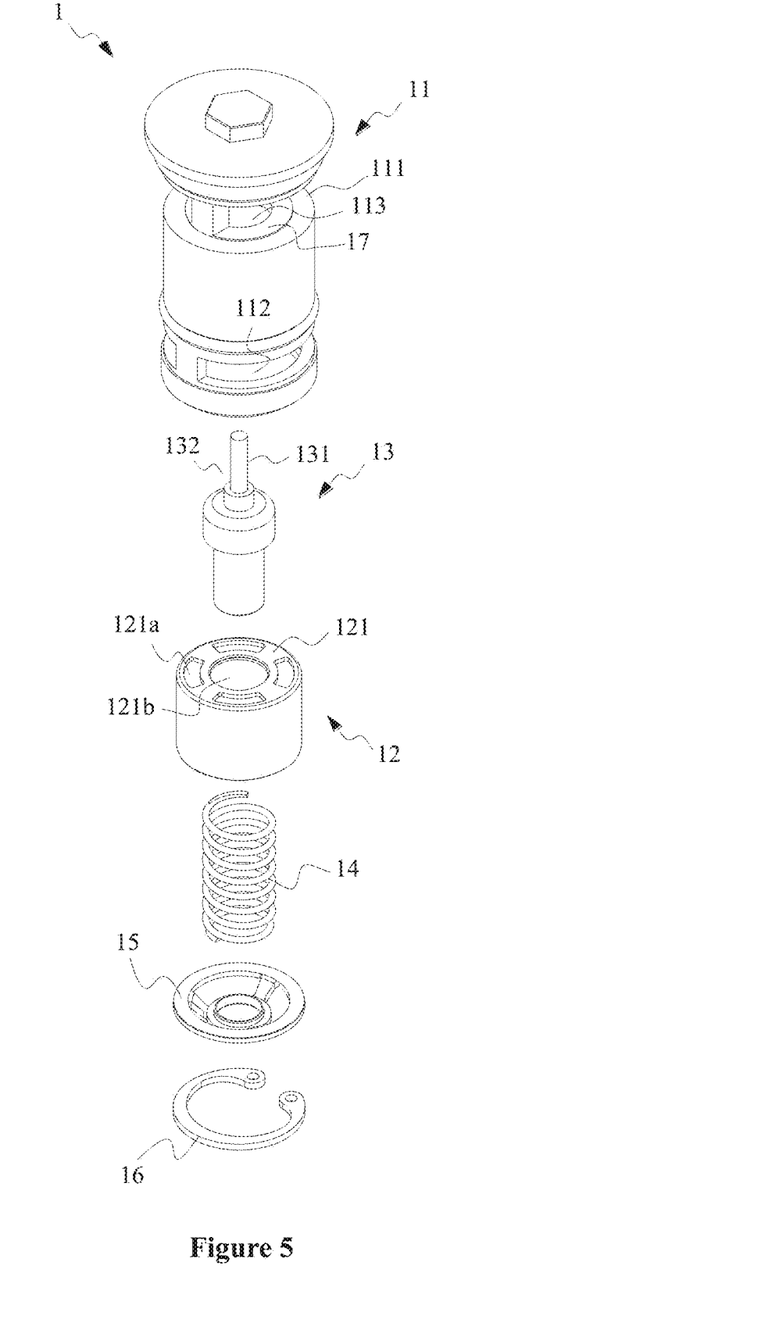
FIG. 5 is an exploded view of the temperature control assembly.
Figure 6:
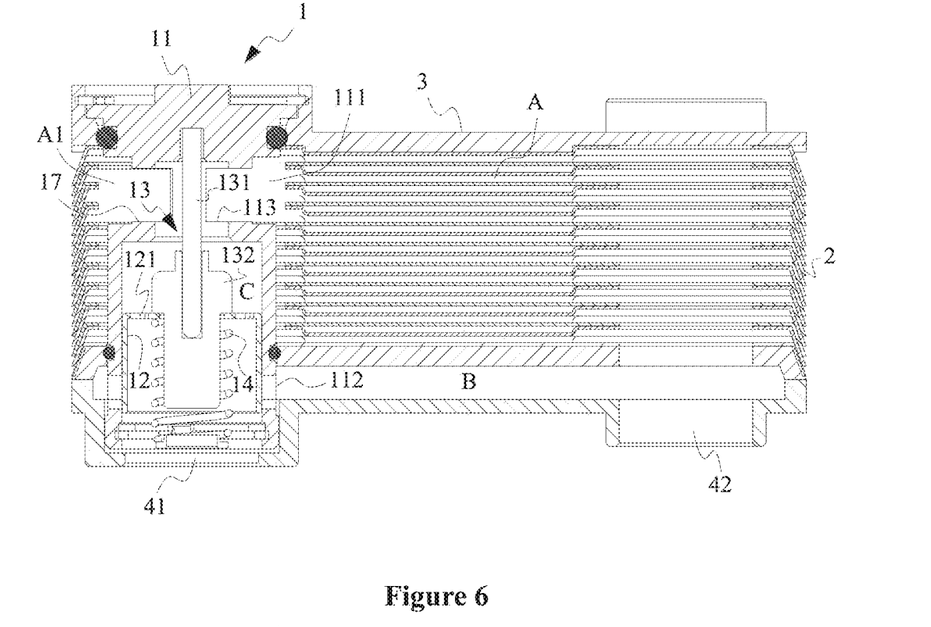
FIG. 6 is a schematic sectional view of the heat exchange device according to the present application when the temperature is abnormal.
Figure 7:
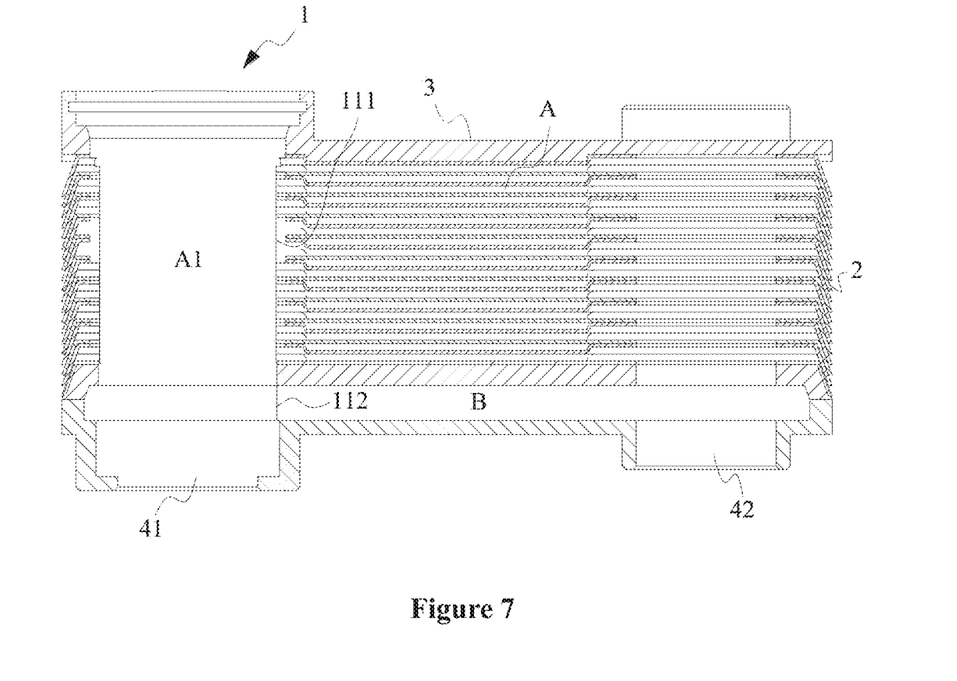
FIG. 7 is a schematic sectional view of the heat exchange device according to the present application when the temperature control assembly is not mounted.

Referring to FIGS. 1 to 7. FIG. 1 is a schematic structural view of a specific embodiment of a heat exchange device according to the present application; FIG. 2 is a schematic structural view of a bottom plate in FIG. 1; FIG. 3 is a schematic sectional view of the heat exchange device according to the present application when the temperature is normal; FIG. 4 is a schematic structural view of a temperature control assembly in FIG. 3; FIG. 5 is an exploded view of the temperature control assembly; FIG. 6 is a schematic sectional view of the heat exchange device according to the present application when the temperature is abnormal; and FIG. 7 is a schematic sectional view of the heat exchange device according to the present application when the temperature control assembly is not mounted.

As shown in FIGS. 1 to 3, a heat exchange device is provided according to the present application, which may include a top plate 3, a bottom plate 4, and a heat exchange assembly 2 arranged therebetween. The heat exchange assembly 2 may specifically be a conventional plate heat exchanger, or may be a plate-fin heat exchanger. The top plate 3 may be provided with a refrigerant inlet 31 and a refrigerant outlet 32 which are in communication with refrigerant passages in the heat exchange assembly 2. The refrigerant may specifically be cooling water or other cooling medium. A heat exchange passage A is further provided in the heat exchange assembly 2, and the heat exchange passage A is isolated from the refrigerant passages. The external fluid can exchange heat with the refrigerant when entering the heat exchange passage A, so as to reduce the temperature of the fluid. Specifically, in the field of vehicle gearboxes, the fluid generally refers to lubricating oil. The lubricating oil can exchange heat with the refrigerant in the refrigerant passage of the heat exchange assembly 2 when passing through the heat exchange passage A, so that the temperature of the lubricating oil is kept normal, thereby ensuring the lubricating property of the lubricating oil.

The bottom plate 4 may be provided with a liquid inlet 41 into which the fluid flows and a liquid outlet 42. An outlet of the heat exchange passage A may be in communication with the liquid outlet 42, that is, the fluid passing through the heat exchange passage A can be discharged through the liquid outlet 42 and then conveyed to other parts through pipelines.

Different from the conventional technology, the heat exchange device according to the present application further integrates a temperature control assembly 1 therein. At least a portion of the temperature control assembly 1 is located in the heat exchange passage A. In the present embodiment, as shown in FIG. 7, the heat exchange passage A includes a first passage A1, and the first passage A1 is arranged corresponding to the liquid inlet 41. A portion of the temperature control assembly 1 extends into the first passage A1. In other words, the first passage A1 actually provides a mounting space for the temperature control assembly 1. A branch passage B is further provided inside the heat exchange device, and one end of the branch passage B is in communication with the liquid outlet 42. The branch passage B may be enclosed by the bottom plate 4 and the heat exchange assembly 2. The bottom plate 4 may be welded to the heat exchange assembly 2 by integral furnace welding to reduce welding spots, thereby ensuring the reliability in the connection between the bottom plate 4 and the heat exchange assembly 2. An outlet of the branch passage B may be in communication with the liquid outlet 42. The liquid inlet 41 may be in communication with the branch passage B or the heat exchange passage A through actions of the temperature control assembly 1.

Specifically, as shown in FIG. 3 and FIG. 4, the temperature control assembly 1 may include a valve body 11, the valve body 11 has a valve chamber C therein, and the valve chamber C is in communication with the liquid inlet 41, that is, the inflow fluid can flow into the valve chamber C through the liquid inlet 41. A notch 111 and a second valve port 112 are provided at intervals on a peripheral wall of the valve body 11 in an axial direction, the notch 111 is relatively away from the liquid inlet 41, and the second valve port 112 is relatively close to the liquid inlet 41. The notch 111 can communicate the valve chamber C with the heat exchange passage A, and the second valve port 112 can communicate the valve chamber C with the branch passage B, that is, the fluid in the valve chamber C can enter the heat exchange passage A through the notch 111, or enter the branch passage B through the second valve port 112.

An annular projection 17 is further provided on an inner wall of the valve chamber C, a first valve port 113 is formed at a middle of the annular projection 17, and the first valve port 113 can communicate the notch 111 with the second valve port 112, that is, in the axial direction, the first valve port 113 is arranged between the notch 111 and the second valve port 112, and the opening and closing of the first valve port 113 can control a communication state of the notch 111 and the second valve port 112.

A cylindrical valve core 12 and a drive component are further arranged inside the valve body 11. A peripheral wall of the valve core 12 is sound, and is in a sliding fit with the inner wall of the valve chamber C. One end of the drive component is fixed at a bottom of the valve chamber C, and another end thereof is in contact with one end of the valve core 12. An elastic member 14 is further provided inside the valve chamber C, and one end of the elastic member 14 abuts against the valve core 12. The drive component abuts against the valve core 12 via the elastic member 14. In the present embodiment, the valve core 12 is sleeved on an outer wall of the drive component, and can abut against a shoulder portion formed on the outer wall of the drive component. The valve core 12 is in a sliding fit with the inner wall of the valve chamber C. The second valve port 112 can be opened or closed by sliding the valve core 12 along the inner wall of the valve chamber C, and the first valve port 113 can be opened or closed by the action of the drive component. One end of the elastic member 14 abuts against an inner bottom wall of the valve core 12, so that the drive component abuts against the valve core 12.

The drive component can drive the valve core 12 to move in the valve chamber C according to temperature changes of the inflow fluid, and cause the peripheral wall of the valve core 12 to block or open the second valve port 112. When the second valve port 112 is in a blocked state, the first valve port 113 is certainly in an open state, so that the fluid in the valve chamber C can flow into the heat exchange passage A through the first valve port 113 and the notch 111. For example, in a case that the temperature of the inflow fluid is higher than a specific temperature, a heat sensitive substance in the drive component expands, and since one end of the drive component is fixed to the bottom of the valve chamber C, the drive component acts downward to push the valve core 12 to move downward when a trust generated by the expansion of the heat sensitive substance is greater than an elastic force of the elastic member 14, so that the valve core 12 can block the second valve port 112 with the peripheral wall of the valve core.

It should be noted that, "the peripheral wall is sound" refers to that no opening or the like structure is provided on the peripheral wall.

With this structure, the heat exchange device provided by the present application not only can realize the function of the heat exchange loop in the conventional technology, but also can integrate the thermostatic valve (that is the temperature control assembly 2) and the heat exchanger (that is the heat exchange assembly 1) in the conventional technology into an entirety, which can greatly simplify the structure of the heat exchange loop, save connecting pipelines between the thermostatic valve and the heat exchanger, save the mounting space of the thermostatic valve, and reduce the occupation space of the heat exchange loop. Moreover, since the heat exchange device herein has a high integration degree and a small occupation space, the installation of the heat exchange device is relatively simple, so that the heat exchange device can meet the requirements for integration and lightweight of the vehicle in the conventional technology.

In the meantime, since the temperature control assembly 1 is integrated inside the heat exchange device, a volume of the temperature control assembly 1 can be smaller, and the weight thereof can be further reduced to achieve lightweight. The material selection and the processing methods of various components in the temperature control assembly 1 can be further diversified. In addition to the conventional metal materials and machining production methods in the conventional technology, materials of the various components may be plastic and the like, and the production methods may be pressure casting, die casting or the like.

More importantly, the valve core 12 of the temperature control assembly 1 of the heat exchange device has a sound cylinder wall, and no opening or the like structure is provided on the peripheral wall of the valve core, which can avoid the second valve port 112 from being reopened after the second valve port is closed in a moving process of the valve core 12, and is beneficial to ensuring the reliability and sealing of the blocking of the second valve port 112.

In addition, the notch 111 does not need to be blocked due to the arrangement of the annular projection 17 and the first valve port 113. When the communication state between the heat exchange passage A and the valve chamber C needs to be closed, simply block the first valve port 113. Besides, since the first valve port 113 is located inside the valve chamber C, the blocking is easier.

Specifically, the drive component further may include a thermal element 13, and the thermal element 13 may be connected with the valve core 12. In the case that the temperature of the inflow fluid is abnormal (beyond a predetermined temperature), the heat sensitive substance in the thermal element 13 expands to cause the thermal element 13 to move, and drives the valve core 12 to move in the valve chamber C, so that the peripheral wall of the valve core 12 can block the second valve port 112. In a case that the temperature is normal, the heat sensitive substance contracts, the valve core 12 moves upward under the action of a restoring force of the elastic member 14.

For ease of description, a direction in which the valve core 12 is moved to close the second valve port 112 is defined as "forward movement", which refers to a direction of downward movement in FIG. 3, and a direction in which the valve core 12 is moved to open the second valve port 112 is defined as "reverse movement", which refers to a direction of upward movement in FIG. 3.

The above abnormal temperature generally refers to that the temperature of the fluid is too high, that is, when the temperature of the fluid is too high, the second valve port 112 can be closed, so that the fluid can only enter the heat exchange passage A through the first valve port 113 and the notch 111 to perform the heat exchange to lower the temperature of the fluid, and then the fluid is discharged through the liquid outlet 42.

The operation of the thermal element 13 can be classed into two cases: a first case is that, the temperature of the inflow fluid is always within a normal range, and in this case, the elastic member 14 can support the valve core 12, so that the valve core 12 is always at a position where the second valve port 112 is opened and the first valve port 113 is closed, and the thermal element 13 does not operate; and a second case is that, the temperature of the inflow fluid changes from abnormal to normal, and when the temperature is abnormal, the valve core 12 is located at a position where the second valve port 112 is blocked and the first valve port 113 is open, and the heat sensitive substance in the thermal element 13 expands due to heat to push the valve core 12 to move downward, and when the temperature of the fluid returns to normal, the thermal element 13 can return to a normal state, and the elastic member 14 can push the valve core 12 to move in a reverse direction in the valve chamber C until the second valve port 112 is opened and the first valve port 113 is closed.

In other words, the above process in which the valve core 12 blocks the second valve port 112 is a process in which the thermal element 13 pushes the valve core 12 to overcome the elastic resistance of the elastic member 14, and when the temperature of the fluid returns to normal, the heat sensitive substance in the thermal element 13 contracts and no longer exerts a pushing force on the valve core 12, and the elastic force of the elastic member 14 is released, so that the valve core 12 is automatically returned.

The opening of the second valve port 112 is further classed into a full opening and a partial opening. When the second valve port is partially opened, the peripheral wall of the valve core 12 can still partially block the second valve port 112. When the second valve port is fully opened, the peripheral wall of the valve core 12 is completely off the second valve port 112.

In actual application, if the temperature of the fluid is within the normal range, the thermal element 13 does not exert any pushing force on the valve core 12, the second valve port 112 can be completely opened under the action of the elastic member 14, and the fluid can almost completely flow out through the branch passage B. In a case that the temperature of the fluid is slightly higher, the thermal element 13 may be deformed to a certain degree, and pushes the valve core 12 in the forward direction by a certain distance, so that the valve core 12 can block a portion of the second valve port 112. In this case, since the opening of the second valve port 112 is small, the fluid cannot completely flow into the branch passage B. and part of the fluid is discharged through the heat exchange passage A. Moreover, the fluid with a lower temperature flowing through the heat exchange passage A can be mixed with the fluid with a higher temperature flowing through the branch passage B at the liquid outlet 42 and the subsequent pipelines, so that the temperature of the fluid flowing out of the heat exchange device can be kept in a substantially normal range. In a case that the temperature of the fluid is too high, the thermal element 13 can be deformed to a large extent to push the valve core 12 to completely close the second valve port 112, and the fluid can only be discharged through the heat exchange passage A.

In other words, the heat exchange device provided by the present application further has a function of regulating an opening size of the second valve port 112 according to the temperature of the fluid.

When the valve core 12 is in a position where the second valve port 112 is completely opened, the thermal element 13 can block the first valve port 113, that is, all the inflow fluid is discharged through the branch passage B to reduce the operation resistance of the fluid, thereby reducing the energy consumption.

In fact, when the second valve port 112 is in the fully opened position, the first valve port 113 may not be closed, that is, the first valve port 113 may be partially opened or completely opened. It should be noted that, the heat exchange passage A is relatively complex, the flow resistance of the fluid in the passage is large, and even if the first valve port 113 is in the open state, most of the inflow fluid still enters the branch passage B through the second valve port 112 to be discharged, while the function of the heat exchange device of the present application is not affected.

In addition, during actual assembly and adjustment process, the heat exchange loop is generally filled with the inflow fluid, and for the heat exchange device provided by the present application, the branch passage B and the valve chamber C need to be filled with the inflow fluid. Under an initial state, the non-closing of the first valve port 113 further allows the inflow fluid to quickly fill the entire heat exchange device, which facilitates the adjustment and assembly.

It should be noted that, the number and mounting positions of the notch 111 and the second valve port 112 are not limited by the embodiments of the present application. In a specific embodiment, the number and mounting positions of the two valve ports may be determined by those skilled in the art according to practical needs. Taking the second valve port 112 as an example, multiple second valve ports 112 may be provided, the second valve ports 112 may be distributed at intervals along the axial direction and the peripheral direction of the valve body 11, and each second valve port 112 is in communication with the branch passage B, as long as it can be ensured that the valve core 12 opens or closes the corresponding second valve port 112 according to the temperature of the fluid. The number of the first valve port 113 is neither limited. However, in order to facilitate blocking, it is preferred to provide one first valve port.

Taking FIG. 4 as an example and referring to FIG. 5, a supporting portion is arranged at one end of the valve core 12 connected with the thermal element 13, and two ends of the thermal element 13 are respectively connected with the valve body 11 and the supporting portion, so as to transfer the drive force of the thermal element 13.

Specifically, the supporting portion may bean annular supporting plate 121, an outer edge of the supporting plate 121 may be connected with the inner wall of the valve core 12. Specifically, the supporting plate may be in an interference fit with the valve core, or the supporting plate may be welded to the valve core, or the supporting plate may be integrally formed with the valve core. Multiple diversion holes 121a may be provided at intervals on a surface of the supporting plate 121 along the peripheral direction.

The thermal element 13 may include a valve rod 131 and a housing 132. The valve rod 131 may be specifically rod-shaped, and the housing 132 may be T-shaped. A vertical portion of the T-shaped housing may be inserted into a center hole 121b of the supporting plate 121 to position an end of the housing 132 connected with the valve core 12. As shown in FIG. 4, the end is a lower end of the housing 132. A lateral portion of the T-shaped housing may abut against the surface of the supporting plate 121.

It can be understood that the lateral portion of the housing 132 does not cover the diversion hole 121a on the surface of the supporting plate 121. Taking FIG. 6 as an example, in a case that the housing 132 pushes the valve core 12 to move in the valve chamber C, the valve chamber C inside the valve core 12 is actually divided into an upper chamber and a lower chamber by the supporting plate 121 and the housing 132, and the diversion hole 121a arranged on the supporting plate 121 can communicate the upper chamber with the lower chamber, that is, when the first valve port 113 is open, the liquid inlet 41 can communicate with the heat exchange passage A through the diversion hole 121a.

The supporting portion is not limited to the form of the supporting plate 121, and may also be designed as other structures. For example, the supporting portion may be multiple raised ribs arranged on the inner peripheral wall of the valve core 12, and a gap between the raised ribs is equivalent to the diversion hole 121a.

In a case that the first valve port 113 is blocked by the thermal element 13, the lateral portion of the housing 132 can abut against an outer edge of the first valve port 113, and in order to improve the reliability of the blocking, one end of the housing 132 (the lateral portion) facing the first valve port 113 may have a conical structure, and an end portion of the first valve port 113 facing the housing 132 may accordingly have a conical guide groove to cooperate with the conical structure.

In order to further ensure the reliability of the blocking, the housing 132 may be made of an elastic material such as rubber.

The elastic member 14 may specifically be a return spring, and the return spring may be sleeved outside a portion of the vertical portion of the housing 132 protruding into the valve core 12, that is, the housing 132 can also play a role similar to a spring column to position the return spring, thereby avoiding the return spring from moving back and forth in a radial direction during the movement of the valve core 12.

Referring to FIG. 4, an end of the valve chamber C away from the valve core 12 may be provided with a recessed first positioning groove, an end surface of the lateral portion of the housing 132 away from the valve core 12 may be provided with a recessed second positioning groove, and two ends of the rod-shaped valve rod 131 may be respectively inserted into the first positioning groove and the second positioning groove to position the valve rod 131. Moreover, the first positioning groove and the second positioning groove have certain depth to ensure the stability of the valve rod 131 during the deformation process of the valve rod.

As shown in FIG. 5, and in conjunction with FIG. 4, the temperature control assembly 1 may further include a valve seat 15 and a snap ring 16. The valve seat 15 may be arranged at the liquid inlet 41, and the snap ring 16 may be arranged inside the valve chamber C and be configured to position the valve seat 15. Two ends of the elastic member 14 may respectively abut against the supporting portion and the valve seat 15.

When the valve core 12 just closes the second valve port 112 during the forward movement, the valve core 12 can abut against the valve seat 15, and the valve seat 15 is further equivalent to a position-limiting component for the valve core 12.

In fact, when the valve core 12 just closes the second valve port 112 during the forward movement, there is still a certain space in the valve chamber C for the forward movement of the valve core 12, that is, the valve core 12 can continue to move forward, which refers to that a certain gap is further provided between the valve core 12 and the valve seat 15 in conjunction with the embodiments of the present application, so as to prevent the valve seat 15 from being directly impacted due to the fact that the valve core 12 continues to move downward after the second valve port 112 is closed caused by too high temperature of the inflow fluid.

In other words, the forward moving space can play a certain role of buffering so as to protect the heat exchange device when the temperature of the inflow fluid is too high.

It should be emphasized that, the heat exchange device and the heat exchange loop having the heat exchange device provided by the embodiments of the present application are not limited to the field of vehicle gearboxes, and can be applied to other fields requiring heat exchange loops and heat exchange devices, for example, heat-dissipation cooling loops of electronic devices such as control panels.

The above embodiments are only preferred embodiments of the present application.

It should be noted that, for those skilled in the art, other improvements and modifications may be further made without departing from the principle of the present application, and these improvements and modifications should also be deemed as falling into the protection scope of the present application.

The invention claimed is:

1. A heat exchange device, comprising a temperature control assembly and a heat exchange assembly, wherein a heat exchange passage is formed inside the heat exchange assembly, and a branch passage arranged in parallel with the heat exchange passage is provided in the heat exchange device; the heat exchange device has a liquid inlet and a liquid outlet, and outlets of the heat exchange passage and the branch passage are in communication with the liquid outlet;

the temperature control assembly comprises a valve body, the valve body has a valve chamber, and the valve chamber is in communication with the liquid inlet; a notch and a second valve port are provided on a peripheral wall of the valve body, the notch is further away from the liquid inlet than the second valve port, the second valve port is closer to the liquid inlet than the notch, the notch is configured to communicate the valve chamber with the heat exchange passage, and the second valve port is configured to communicate the valve chamber with the branch passage;

the valve body comprises an annular projection, a first valve port is formed at a middle of the annular projection, and the first valve port is configured to communicate the notch with the second valve port; and a valve core and a drive component are further provided inside the valve body, the valve core is cylindrical, a peripheral wall of the valve core is sound, the valve core is in a sliding fit with a corresponding inner wall of the valve chamber, the drive component is in cooperation with the first valve port, the peripheral wall of the valve core is configured to block the second valve port through an action of the valve core, the drive component is configured to block the first valve port through an action of the drive component, and in a case that the second valve port is in a blocked state, the first valve port is in an open state wherein the drive component comprises a thermal element, and one end of the thermal element is in contact with the valve core, and another end passing through the first valve port is fixed at a bottom of the valve chamber, wherein a supporting portion is arranged at a connection end of the valve core in contact with the thermal element, and a diversion hole is provided at a portion of the supporting portion not in contact with the thermal element; and in a case that the first valve port is not blocked by the thermal element, the liquid inlet is in communication with the heat exchange passage through the diversion hole.

2. The heat exchange device according to claim 1, wherein an elastic member is further provided inside the valve chamber; and one end of the elastic member abuts against the valve core, and the thermal element abuts against the valve core via the elastic member.

3. The heat exchange device according to claim 2, wherein the thermal element is capable of blocking the first valve port, when the valve core is at a position where the second valve port is completely opened; or the first valve port is not closed, when the valve core is at the position where the second valve port is completely opened.

4. The heat exchange device according to claim 2, wherein the heat exchange passage comprises a first passage, the first passage is arranged corresponding to the liquid inlet, at least a portion of the temperature control assembly is extended into the first passage, the first valve port is located in the first passage, the second valve port is arranged corresponding to the branch passage, and the branch passage is not in direct communication with the first passage.

5. The heat exchange device according to claim 4, wherein the temperature control assembly further comprises a valve seat and a snap ring, the valve seat is provided at the liquid inlet, and two ends of the elastic member abut against the supporting portion and the valve seat, respectively; and the snap ring is arranged inside the valve chamber, and is configured to position the valve seat.

6. The heat exchange device according to claim 5, wherein, when the valve core is moved to a position where the second valve port is blocked, the valve core is capable of abutting against the valve seat; or, when the valve core is moved to the position where the second valve port is blocked, there is still a certain space in the valve chamber for forward movement of the valve core.

7. The heat exchange device according to claim 6, further comprising a bottom plate, wherein the liquid inlet and the liquid outlet are both arranged on the bottom plate, and the branch passage is enclosed by the bottom plate and the heat exchange assembly.

8. The heat exchange device according to claim 4, further comprising a bottom plate, wherein the liquid inlet and the liquid outlet are both arranged on the bottom plate, and the branch passage is enclosed by the bottom plate and the heat exchange assembly.

9. The heat exchange device according to claim 2, wherein the supporting portion is an annular supporting plate, a plurality of diversion holes are provided, the plurality of diversion holes are arranged at intervals on a surface of the supporting plate in a peripheral direction, and the supporting plate is further provided with a center hole; and the thermal element comprises a valve rod and a housing, the housing is T-shaped, a vertical portion of the housing is inserted into the center hole of the supporting plate, a lateral portion of the housing abuts against the supporting plate, and two ends of the valve rod are connected to the valve body and the housing, respectively.

10. The heat exchange device according to claim 9, wherein the elastic member is a return spring, and the return spring is sleeved on a portion of the vertical portion protruding into the valve core.

11. The heat exchange device according to claim 1, further comprising a bottom plate, wherein the liquid inlet and the liquid outlet are both arranged on the bottom plate, and the branch passage is enclosed by the bottom plate and the heat exchange assembly.

* * * * *